UNITED STATES PATENT OFFICE.

WALTER HEAPE, OF LONDON, AND HORACE BERE GRYLLS, OF WEYBRIDGE, ENGLAND.

MANUFACTURE OF CARBONS FOR ELECTRIC-ARC LAMPS.

1,302,795.     Specification of Letters Patent.     Patented May 6, 1919.

No Drawing.     Application filed March 26, 1919. Serial No. 285,372.

*To all whom it may concern:*

Be it known that we, WALTER HEAPE, F. R. S., a subject of the King of Great Britain and Ireland, of 10 King's Bench Walk, Temple, London, E. C. 4, England, and HORACE BERE GRYLLS, J. P., a subject of the King of Great Britain and Ireland, of Amerden House, Oatlands Chase, Weybridge, in the county of Surrey, England, have invented certain new and useful Improvements in the Manufacture of Carbons for Electric-Arc Lamps, of which the following is a specification.

This invention relates to the manufacture of carbons for electric arc lamps and is of more particular utility in the case of searchlight arc carbons.

The object of the present invention is to improve the manufacture of carbons to which a salt of calcium is to be added, so that the finished carbon will contain the right proportion of calcium to give the best results in practice.

The invention comprises a method of preparing carbons for electric arc lamps which consists in impregnating the carbons with or otherwise incorporating therein a solution of an organic salt of calcium of a strength such that the finished carbon will contain a percentage by weight of calcium oxid between the limits of $\frac{1}{4}$% and 1%.

The invention further comprises other details hereinafter indicated.

The invention also consists in the employment for the purpose of impregnating the carbons, of a solution of an albuminoid or carbohydrate colloid of low viscosity, containing a suitable proportion of a compound adapted to vary the character or quality of the light emitted by the arc, as for example, by increasing the brilliancy of the light and giving a greater total quantity of light for a given consumption of power.

As such compounds organic salts of calcium may be employed.

Preferably, the impregnating solution also contains a proportion of a suitable cerium salt.

As examples, of the colloids that may be used in accordance with the invention, gelatin, glue, starch, dextrin and the carbohydrate gums, such as gum arabic, may be mentioned.

When gelatin is employed, the impregnating solution may, with advantage, contain approximately 0.75 per cent. of gelatin and when other colloids are used, they are advantageously employed in the form of solutions of a viscosity comparable with the viscosity of the gelatin solution specified.

The solution may be employed cold, or warmed, and, in practice, it will be found convenient to prepare a stock solution of, for instance, gelatin of 1.5 per cent. strength and to mix one part of this solution with approximately an equal quantity of a stock solution of the impregnating salt, or of a mixture of stock solutions of the impregnating salts, which are of such strength that the solution produced by the admixture of the stock solutions in such proportions will yield an impregnating solution of the required composition.

Thus, 1,000 parts of a solution of calcium acetate of 1.1051 s. g. at 15° C. may be mixed with 920 parts of a 1.5 per cent. solution of gelatin and 80 parts of a solution of cerous nitrate of 1.208 s. g. at 15° C.

In carrying our invention into effect in one convenient manner, we take ordinary finished carbons and these carbons we soak for, say, from two to five hours in a solution of an organic salt of calcium, such as calcium acetate, preferably mixed with a solution of cerous nitrate or with another suitable salt of the cerium or tungsten groups, the solution being of a strength such that the finished carbon will contain a percentage by weight of calcium oxid between $\frac{1}{4}$% and 1% (the best results having so far been obtained with a solution of 1$\frac{1}{2}$% strength and approximately 1% of cerous nitrate.)

The carbons having been submitted to a first impregnating process are placed *in vacuo* while still in the impregnating solution and allowed to remain so for, say, five hours, this procedure having for its object to obtain a thorough and, as far as possible, uniform impregnation of the carbons, although a similar result may be obtained by boiling the carbons in the solution in which they are immersed provided that the boiling takes place in conjunction with some form of reflux condenser in order that the strength of the solution may not be varied, through evaporation, during the process.

In a convenient process according to the invention the carbons are placed in a suitable receptacle which is connected with an air pump and is evacuated. In order to assist in the removal of the gases contained or held in the pores of the carbons, they may be heated to a suitable temperature while in the space to be, or being, evacuated. When the carbons have been treated in this manner for a period sufficient to remove or to attenuate to the desired degree the gases contained in their pores, or otherwise held by them, they are immersed in the impregnating liquid which may for example, be admitted to the vessel under the action of the atmospheric pressure.

The carbons are conveniently completely immersed in the impregnating liquid, but in some cases it may be found desirable or convenient to rely, in part, upon surface energy to effect the permeation of the carbons by the liquid.

Having been thoroughly impregnated the carbons are surface washed and dried and subsequently put into an oven which is warmed gradually to a temperature of, preferably, 100° centigrade, after which the carbons are baked in steel retorts or other suitable apparatus at a temperature, for example, of about 1000° or 1100° centigrade. The retorts are preferably such that no fresh air is admitted thereto during the baking operation and while the length of time occupied by the warming and baking may be varied as may seem desirable, we have found that good results are obtained by allowing the carbons to cool down gradually in the retorts and by regulating the operation so that the period elapsing between the inital warming of the carbons and their final cooling down is about fifteen hours.

We have found that during the drying process there is a tendency for the material with which the carbons are impregnated to exude therefrom, often to a very considerable extent, with the result that unless this were checked the carbons would not retain the proportion of impregnating material which we find to be necessary in order to give satisfactory results. According to our invention we completely avoid such exudation by using a calcuim acetate or other solution of a strength greater than that required for impregnation and diluted to the desired strength by means of a strong solution of sugar, the strength of which should preferably not be below 6 lbs. of sugar made up to one gallon with water, the specific gravity of this solution being about 1.218 at 15° C., but it will be understood that we may substitute for the sugar solution a solution of any colloid that will be found to give satisfactory results in practice.

As an example of suitable proportions we may take the following:—

1000 parts of a solution of calcium acetate of a specific gravity of 1.1051 at 15° C.;

920 parts of a solution of sugar made up of 6 lbs. of sugar to 1 gallon of water of a specific gravity of 1.218 at 15° C.; and 80 parts of a solution of cerous nitrate of 25% strength and of a specific gravity of 1.208 at 15° C.

This gives a solution containing approximately 11% of calcium acetate and 1% of cerous nitrate, so that the finished carbon will contain a percentage by weight of calcium oxid equal approximately to 0.744%.

Experience shows that there is a tendency for impregnated carbons to burn with a long taper, thus detracting from their efficiency in operation, but this tendency we completely eliminate by copper coating in any suitable manner both the negative and the positive carbons, and we find that by means of our invention we are enabled to produce an arc in which the diameter of the crater is very considerably reduced, while the intrinsic brilliancy and total candle power of the arc for a given consumption of power is very considerably increased and practical tests of arcs formed between carbons in accordance with the invention show that such carbons produce an arc which is very much more efficient as regards concentration and production of light and consumption of power than the carbons generally adopted, while our improved carbons may quite readily be applied in existing searchlight installations, although it is found that even better results are obtained when using our carbons in apparatus designed for rotating the positive carbon and still further improvement is effected by inclining the negative carbon in addition to rotating the positive carbon.

The foregoing details are given by way of example only as showing one method of carrying the invention into effect, and it is to be understood that we may employ any suitable calcium salt solution for impregnating the carbons either by itself or in conjunction with a solution of a suitable salt of elements of either the cerium or tungsten groups varying also the temperatures for the different operations and the length of time for which such operations are continued as may be found to give most satisfactory results in practice.

Having now described our invention, what we claim as new and desire to secure by Letters Patent is:—

1. In the treatment of carbons for electric arc lamps, the employment for the purpose of impregnation of a solution of an albuminoid or carbohydrate colloid of low viscosity containing a suitable proportion of a compound such as an organic salt of calcium.

2. In the treatment of carbons for electric arc lamps with an impregnation solution as claimed in claim 1, the addition to the impregnation solution of a proportion of a suitable cerium salt.

3. A method of preparing carbons for electric arm lamps which consists in impregnating the carbons with or otherwise incorporating therein a solution of an organic salt of calcium of a strength such that the finished carbon will contain a percentage by weight of calcium oxid between the limits of $\frac{1}{2}\%$ and $1\%$, substantially as and for the purpose hereinbefore set forth.

4. A method of preparing carbons for electric arc lamps according to claim 3, in which the solution of organic salt of calcium is reduced to the required strength by an admixture of a solution of sugar or of a colloid, substantially as and for the purpose hereinbefore set forth.

5. A method of preparing carbons for electric arc lamps as claimed in claim 3, in which the carbons are immersed in a solution of an organic salt of calcium, and after having been submitted to this first impregnating process are placed *in vacuo* while still in the impregnating solution and allowed to remain so for, say, five hours or thereabout, substantially as and for the purpose set forth.

6. A method of preparing carbons for electric arc lamps according to claim 4, in which the carbons, after having been submitted to the impregnating process, are surface washed and dried, subsequently put into an oven warmed to a moderate temperature and subsequently baked in airtight retorts at a temperature of about 1000° or 1100° centigrade.

7. A method of treating carbons for electric arc lamps which consists in inclosing the carbons while dry in a chamber or receptacle, evacuating the gas from said inclosing space, and then immersing the carbons in the impregnating liquid.

8. A method of treating carbons for electric arc lamps according to claim 7, in which the carbons are subjected to heat while in the space to be or being evacuated.

In testimony whereof we have signed our names to this specification.

WALTER HEAPE.
HORACE BERE GRYLLS.